United States Patent Office 2,896,127
Patented July 21, 1959

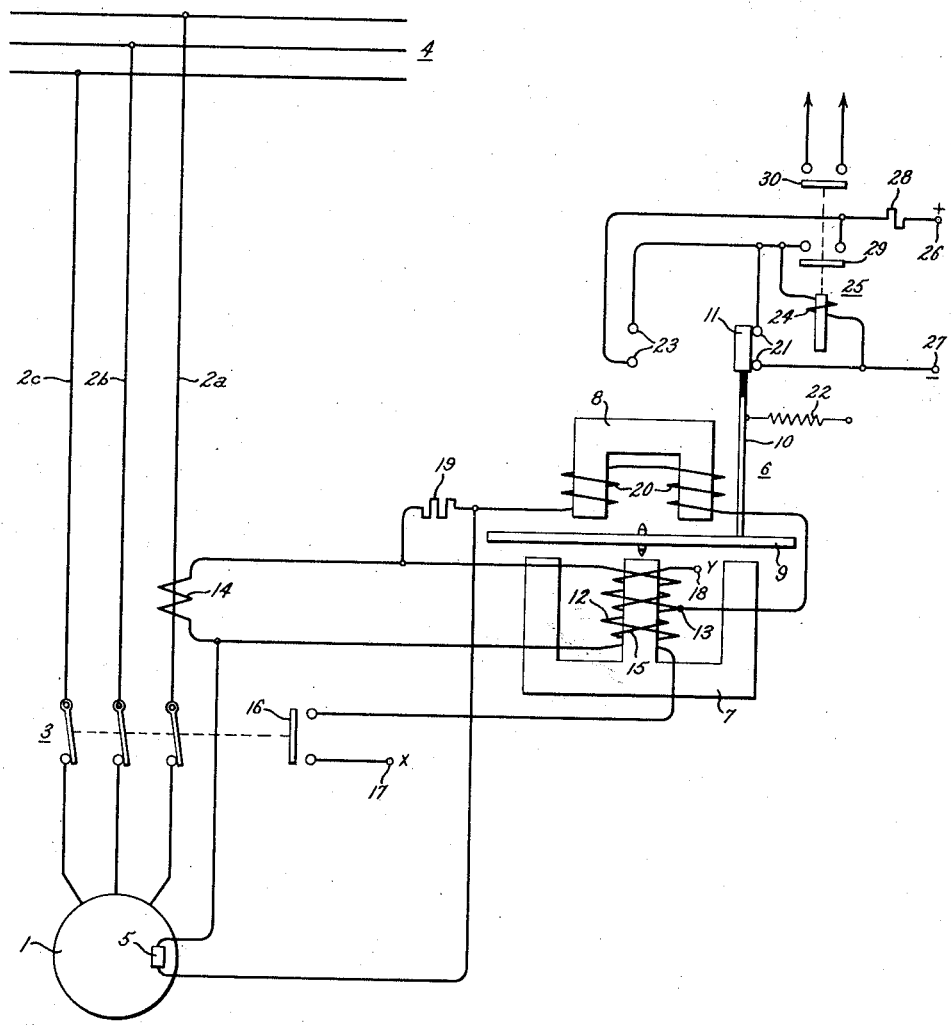

2,896,127

TEMPERATURE RESPONSIVE PROTECTIVE RELAY

Harold T. Seeley, Havertown, Pa., assignor to General Electric Company, a corporation of New York Application June 26, 1956, Serial No. 593,945

5 Claims. (Cl. 317—40)

This invention relates to improvements in protective relays and more particularly to improvements in a relay responsive to predetermined abnormal temperature conditions in electrical apparatus.

Electrical apparatus such as a motor, generator or power transformer is susceptible to damaging insulation failure caused by sustained operation at abnormally high winding temperatures. In large power rated equipment particularly, small variations in cooling conditions can result in accelerated insulation deterioration. It is therefore customary to provide temperature sensitive relay means for initiating remedial action whenever the temperature of the apparatus windings exceeds a safe operating limit.

A conventional temperature relay means that is well known in the art includes, for example, an electromagnetic unit of the product or wattmetric type having operating and polarizing coils. The polarizing coil may be energized by a suitable alternating electric quantity having predetermined constant characteristics, while the operating coil is connected across normally equal potential points of a Wheatstone bridge formed by a pair of voltage dividing resistors, a reference resistor of substantially constant resistance and a special temperature sensitive resistor embedded adjacent the load carrying windings in the apparatus. The Wheatstone bridge is connected through current limiting means (to prevent error due to self-heating of the temperature sensitive resistor) to a suitable source of alternating current excitation. As the temperature in the protected apparatus rises beyond a safe limit, the resistance of the temperature sensitive resistor increases from normal thereby disturbing the balance of the Wheatstone bridge and causing current flow in the operating coil of the electromagnetic unit. The operating coil in conjunction with the polarizing coil will now produce operating torque in a movable induction element which is designed to perform a preselected circuit controlling function for initiating desired protective operation.

It is an object of this invention to provide a new and improved temperature relay which is more sensitive and more reliable than the conventional relay described above.

Another object of the invention is to provide an improved temperature relay capable of extremely accurate and positive operation while being substantially unaffected by physical shock or vibration.

It is a further object of the invention to provide a more compact temperature relay having fewer components and lower manufacturing cost than the above mentioned conventional relay.

Still another object is the provision of a temperature relay provided for excitation in accordance with the load current of the protected apparatus thereby improving the temperature responsive characteristic of the relay.

As explained above, temperature relays are used to detect predetermined abnormal temperature conditions in the windings of electrical apparatus. The electrical apparatus, which is connected in an alternating current electric power system, usually is provided with at least one temperature sensitive resistor embedded near its windings. A temperature relay constructed in accordance with one form of my invention utilizes an electromagnetic unit comprising a movable circuit controlling induction element and a stationary magnetizable structure. A tapped polarizing winding is provided on the magnetizable structure for energization in accordance with current flowing in the load circuit which connects the apparatus to the power system. A reference resistor of predetermined substantially constant resistance is connected in series circuit relation with the temperature sensitive resistor, and this series combination is connected across the tapped polarizing winding to form therewith a Wheatstone bridge. An operating winding located on the magnetizable structure is connected to the Wheatstone bridge between points of normally equal potential. Thus, abnormally high temperature in the apparatus windings will cause the resistance of the temperature sensitive resistor to increase thereby unbalancing the bridge and causing current to traverse the operating winding. The resulting magnetic flux produced by the operating winding together with the out-of-phase polarizing winding magnetic flux produce operating torque in the induction element.

To provide for a situation wherein temperature response is desired while the apparatus is disconnected from the power system, I furnish a second polarizing winding magnetically coupled to the tapped polarizing winding. The second winding is connected for energization by a suitable source of alternating voltage whenever the apparatus is disconnected from the system, whereby Wheatstone bridge excitation is maintained even though no current is flowing in the connecting circuit.

My invention will be better understood and further objects and advantages will be apparent from the following description taken in conjunction with the accompanying drawing, the single figure of which is a diagrammatic illustration of a temperature responsive protective relay constructed in accordance with one embodiment of my invention.

Referring now to the drawing, an alternating current motor 1 has been shown connected by means of three circuit conductors 2a, 2b and 2c and circuit interrupting means 3 to a 3-phase electric power system 4. Motor 1 is provided with an embedded temperature sensitive resistor 5 whose resistance will vary in accordance with the temperature of the surrounding medium. Resistor 5, known in the art as a resistance temperature detector, is located at a selected critical spot adjacent to and electrically insulated from the load carrying windings of the motor, and it is made to be substantially non-inductive. The motor which has been illustrated is intended to represent electrical apparatus in general, and it should be understood that other equipment such as generators or power transformers provided with similar temperature sensitive resistors could also be protected by a temperature relay constructed in accordance with my invention.

As can be seen in the drawing, the temperature relay 6 includes an electromagnetic unit of the well known wattmetric or product type which may comprise, for example, a W-shaped member 7 and an opposing inverted U-shaped member 8. These members are parts of a stationary magnetizable structure or frame of the electromagnetic unit. The extremities of the projecting legs of the members 7 and 8 define two spaced apart parallel planes, and a movable induction element, illustrated a disk 9, is axially disposed for rotation in a plane parallel to and intermediate said extremities. The induction element 9 carries an arm 10 terminating in a switch contact 11 which performs a circuit controlling function to be described in detail hereinafter.

A polarizing winding 12 having an intermediate tap 13 is wound on a central leg of the W-shaped member 7. Intermediate tap 13 is located so as to divide winding 12 into two parts each preferably having approximately the same number of turns. This winding is connected for energization to a suitable current transformer 14 which is coupled to the circuit conductor 2a. Thus, winding 12 is energized in accordance with the load current of the apparatus. Current transformer 14 preferably is one which will saturate during overcurrent conditions in conductor 2a, whereby the maximum possible current in the temperature relay circuits is limited to a harmless magnitude. In practice, in order that a high turns ratio may economically be obtained, it may be desirable to provide an auxiliary current transformer, not shown, in addition to the illustrated transformer 14.

A second polarizing winding 15 is also wound on the central leg of the W-shaped member 7 and thus is magnetically coupled to the tapped polarizing winding 12. Winding 15 is connected for energization through circuit means including a switch 16 to a suitable source of substantially constant alternating voltage represented in the drawing by terminals 17 and 18. Switch 16 is arranged to be closed when circuit interrupter 3 is in its open circuit position. Thus, the second polarizing winding 15 is energized only when motor 1 is disconnected from the power system 4 and there is no load current flowing in circuit conductor 2a. Although I have illustrated switch 16 as being controlled directly by circuit interrupter 3, it should be understood that alternatively this switching function could be made responsive to circuit breaker opening operation conditions such as indicated by a control contactor (not shown) or the like.

In some applications of my invention, it may be desired to forego current energization of the tapped polarizing winding 12 and to have the second polarizing winding 15 connected at all times to the source of alternating voltage 17, 18. In this event the illustrated embodiment of my invention would be modified simply by eliminating the current transformer 14 and by shorting or bypassing the switch 16.

A reference resistor 19 of substantially constant resistance is connected in series circuit relationship with the temperature sensitive resistor 5 of motor 1, and this series combination is connected across the tapped polarizing winding 12. Resistors 5 and 19 together with the two parts of winding 12 constitute the four arms of a Wheatstone bridge. An operating winding 20, which is wound on the legs of the inverted U-shaped member 8 as shown in the drawing, is connected across the Wheatstone bridge, or more specifically, to intermediate tap 13 and to the common connection between reference resistor 19 and temperature sensitive resistor 5. The resistance of resistor 19 is preselected to define with the resistance of resistor 5 under normal motor operating conditions a ratio which is approximately equal to the turns ratio of the corresponding parts of winding 12. Thus the operating winding 20 is connected between points of normally equal potential. As noted above, the two parts of winding 12 have approximately equal turns in the preferred embodiment of my invention, and accordingly the resistances of resistors 5 and 19 are normally about equal.

In a manner well known to those skilled in the art, torque is produced in the induction element 9 of the electromagnetic unit by the interaction of out-of-phase magnetic fields produced by energizing currents traversing the turns of the operating and polarizing windings. The magnitude and direction of torque is dependent upon the strength of the operating winding and polarizing winding magnetic fields and the amount of phase displacement therebetween. The phase displacement as well as the strength of the operating winding field is determined by the resistance of the temperature sensitive resistor 5. Whenever this resistance is normal, that is, substantially equal to the resistance of reference resistor 19, no energizing current flows in operating winding 20 and consequently there is no operating winding field and no torque in induction element 9.

When the temperature sensitive resistance is less than normal, the Wheatstone bridge is unbalanced, current flows in winding 20, and resetting torque is produced in induction element 9. The relative connections of the operating and polarizing windings are such that resetting torque is exerted in a direction tending to move the arm 10 which is carried by induction element 9 to the right, as viewed in the drawing. Such movement is stopped with the induction element in its reset or "cold" position by the engagement of movable switch contact 11 with a pair of stationary contacts 21, as is shown in the drawing. Suitable biasing means, such as the illustrated tension spring 22 connected to arm 10, may be used to urge the induction element 9 to this cold position.

As the temperature sensitive resistance increases above normal, the phase relationship between operating winding and polarizing winding currents is such that operating torque is produced in induction element 9 in a direction opposing the bias force. Eventually sufficient operating torque can be developed to move the induction element to its operated or "hot" position wherein movable switch contact 11 engages a pair of stationary switch contacts 23. Damping means, such as a permanent magnet (not shown), is provided to retard induction element movement in either direction, whereby the possible adverse effects of sudden physical shocks are minimized.

In its hot position, movable switch contact 11 bridges the pair of stationary contacts 23 thereby connecting an operating coil 24 of an auxiliary electromagnetic relay 25 to a suitable source of direct current energization represented by terminals 26 and 27. A resistor 28 is connected in series circuit relation with coil 24. Whenever auxiliary relay 25 is thus energized, it operates to close two normally open contacts 29 and 30. As shown in the drawing, contact 29 is connected across switch contacts 23 and is used to seal-in auxiliary relay 25 by retaining coil 24 energized even after movable switch contact 11 has become disengaged from stationary switch contacts 23. Contact 30 can be used to perform a desired circuit controlling function, such as energizing an alarm device (not shown), or initiating an automatic operation which reduces or removes the load on motor 1. Operating coil 24 of auxiliary relay 25 remains energized and contact 30 remains closed until movable switch contact 11 again engages stationary switch contacts 21 as the induction element 9 returns to its reset or cold position. Contacts 21 are connected across operating coil 24 and provide a shunt circuit around this coil, thus deenergizing it, when bridged by contact 11.

From the foregoing detailed description of the structure and connections of my temperature relay, its mode of operation may now be readily followed. Whenever the resistance of temperature sensitive resistor 5 becomes greater than the resistance of the reference resistor 19, which increase in resistance indicates that the temperature in the windings of motor 1 is rising above normal, the Wheatstone bridge formed by these two resistors in conjunction with the tapped polarizing winding 12 is unbalanced and a portion of the current supplied by current transformer 14 and flowing in winding 12 traverses the operating winding 20. The resulting magnetic fluxes produced by these windings interact as explained hereinbefore to produce operating torque tending to move induction element 9 in opposition to its biasing means 22. The greater the temperature sensitive resistance, the greater is the potential difference across operating winding 20 and accordingly the greater is the magnitude of torque developed in element 9. When the resistance has increased to a point corresponding to a predetermined abnormal temperature condition in motor 1, sufficient torque will be produced to overcome the opposing bias force and cause the induction element to move to its operated or hot position wherein switch contact 11 engages contacts 23. As a result, the operating coil 24 of auxiliary relay 25 is energized and sealed in through its contact 29, while contact 30 closes to perform the desired circuit controlling operation which indicates that motor 1 is too hot for safe operation. The above described operation is substantially unaffected by ambient temperature variations, since the effects of such variations in the individual circuit elements tend to cancel one another.

A marked advantage is gained by the utilization of current excitation for the Wheatstone bridge circuit of my relay. A heavy overload on motor 1, such as occurring during motor starting, is reflected by current transformer 14, and increased current will flow in the arms of the Wheatstone bridge. Thus the temperature sensitive resistor 5 is heated directly during an overload condition. The turns ratio of transformer 14 preferably is selected whereby the current density in the temperature sensitive resistor bears a fixed relationship to the current density in the load carrying windings of motor 1. As a result, resistor 5 is able to furnish a more accurate indication of the temperature in the load carrying windings than would be possible if it were heated solely by conduction through the electrical insulation of these windings. This self-heating effect is particularly advantageous in connection with large hydrogen-cooled apparatus wherein the normal temperature differential between load windings and an embedded temperature sensitive resistor may be relatively large.

The circuit controlling operation described hereinbefore is used to initiate some sort of corrective action, and eventually the temperature in the motor windings will have fallen sufficiently to permit safe operation of the motor. In the process, temperature sensitive resistor 5 is cooled and its resistance decreases thereby reducing the amount of operating torque in the induction element 9. When a predetermined safe temperature is reached as detected by resistor 5, operating torque will become less than biasing force, and induction element 9 is returned to its reset or cool position wherein switch contact 11 engages contacts 21. This deenergizes the operating coil 24 of auxiliary relay 25 which returns to its normal position with contact 30 open, whereby positive indication is given that motor 1 may again be put into normal operation. The precise temperature at which movable contact 11 will engage stationary contacts 21 can be controlled by the position of the stationary contacts 21 in accordance with suitable adjusting means not shown.

The remedial operation which is initiated by the temperature relay in response to the predetermined abnormal temperature condition in motor 1 may include disconnecting the motor from the electric power system 4. After circuit interrupter 3 has been opened, load current no longer flows in conductor 2a. However, excitation of the Wheatstone bridge must be maintained in order to permit proper relay operation for indicating a return to safe temperature conditions. This is accomplished by connecting the second polarizing winding 15 to the source of alternating voltage 17, 18 by means of switch 16. Now the source of current for the operating winding 20 is provided by the tapped polarizing winding 12 which is magnetically coupled to winding 15, and proper relay response to falling temperature in motor 1 is obtained.

The use of two magnetically coupled polarizing windings has a number of distinct advantages. Desirable electrical isolation of the temperature relay circuits from other circuits is realized. By appropriate selection of the turns ratio, a suitably low excitation voltage is applied to the Wheatstone bridge whereby undesirable self-heating of the temperature sensitive resistor is avoided. (This is not the overload situation mentioned hereinbefore.) Furthermore, the aforesaid low excitation voltage is obtained without electric power loss as would occur in a series connected rheostat or the like.

With the temperature relay arrangement shown in the drawing and described above, increased sensitivity and increased contact pressure is obtained over prior conventional relays such as those using four resistors to form the Wheatstone bridge. To obtain maximum torque in the induction element 9, the operating winding 20 should be designed for maximum power transfer from the excitation source. The problem is similar to that of matching a generator to its load for maximum power transfer but is complicated by consideration of the phase angle of operating current with respect to polarizing current. It can be shown that for a given value of excitation and for a given degree of unbalance in the Wheatstone bridge, the magnitude of current in the operating winding 20 is nearly twice that which would flow if all four arms of the Wheatstone bridge were resistive. Thus, relay sensitivity is increased and it is possible to develop greater torque for a given temperature rise.

While I have shown and described a preferred form of my invention by way of illustration, many modifications will occur to those skilled in the art. I therefore contemplate by the claims which conclude this specification to cover all such modifications as fall within the true spirit and scope of my invention.

What I claim as new and desire to secure by Letters Patent of the United States is:

1. A circuit controlling relay responsive to resistance variations of a temperature detector comprising, an electromagnetic unit including a circuit controlling induction element and a magnetizable structure, a tapped winding disposed on said structure, a polarizing winding magnetically coupled to said tapped winding and connected for energization to a source of substantially constant alternating voltage, a reference resistor of predetermined substantially constant resistance, circuit means interconnecting said resistor, detector and tapped winding to form a Wheatstone bridge, and an operating winding disposed on said structure and connected across said bridge between points of normally equal potential, whereby variations in the resistance of the temperature detector unbalance said bridge and cause current flow in said operating winding thereby tending to actuate said induction element.

2. A relay for detecting abnormal temperature conditions in electrical apparatus provided with a temperature detector comprising, a magnetic structure and a cooperating induction element, a first winding mounted on said structure and provided with an intermediate tap, a polarizing winding magnetically coupled to said first winding and provided with terminals for connection to a source of alternating voltage, a reference resistor of substantially constant resistance having a predetermined relationship with respect to the resistance of the temperature detector at a predetermined normal temperature, circuit means interconnecting said resistor, detector and first winding to form a Wheatstone bridge, and an operating winding disposed on said structure and connected across opposite points of said bridge to actuate said induction element in response to unbalance of said bridge produced by variations in the resistance of said detector.

3. In a relay for detecting abnormal temperature conditions in electrical apparatus having current carrying windings and a temperature sensitive resistor, an electromagnetic unit including a movable circuit controlling induction element and a stationary magnetizable structure, a tapped polarizing winding disposed on said structure, a reference resistor of predetermined substantially constant resistance connected in series circuit relationship with the temperature sensitive resistor across said polarizing winding thereby to form a Wheatstone bridge, means connecting said polarizing winding for energization in proportion to the current of the apparatus, said proportion being selected so that the current density in the temperature sensitive resistor bears a fixed relationship to the current density in the current carrying windings, another polarizing winding magnetically coupled to said tapped polarizing winding and adapted to be energized by alternating voltage whenever the apparatus current is zero, and an operating winding disposed on said structure and connected to said bridge at points of normally equal potential, whereby variations in the resistance of the temperature sensitive resistor unbalance the bridge and cause current flow in said operating winding which in conjunction with the energized polarizing winding produces torque in said induction element.

4. In a temperature relay for electrical apparatus provided with a temperature detector and adapted to be connected to an alternating current system by means of a circuit and a circuit interrupter, a magnetic structure and a cooperating induction element, a first polarizing winding provided with an intermediate tap and disposed on said structure for energization in accordance with the current in the circuit, a second polarizing winding magnetically coupled to said first winding, circuit means responsive to circuit interrupter opening operation conditions to connect said second polarizing winding to a source of alternating voltage, a reference resistor of predetermined substantially constant resistance connected in series with the temperature detector across said first polarizing winding to form a Wheatstone bridge, and an operating winding disposed on said structure and connected between said intermediate tap and the common point of said series connected reference resistor and temperature detector, the value of current traversing said operating winding and consequently the torque produced in said induction element being determined by the resistance of the temperature detector.

5. In a temperature relay for electrical apparatus provided with a temperature detector and adapted to be connected to a source of alternating current by means of a circuit and a circuit interrupter, an electromagnetic unit including a movable circuit controlling induction element and a stationary magnetizable structure, a tapped polarizing winding on said structure adapted to be energized in accordance with the current flowing in the circuit, a second polarizing winding magnetically coupled to said tapped winding, means connecting said second winding for energization by substantially constant alternating voltage whenever the circuit interrupter is in an open circuit position, a reference resistor of predetermined substantially constant resistance, means interconnecting said reference resistor, temperature detector and tapped winding to form a Wheatstone bridge, and an operating winding on said structure connected across said bridge, whereby the resistance of the temperature detector affects the balance of said bridge and thus controls the value of current traversing said operating winding and the torque produced in said induction element.

References Cited in the file of this patent

UNITED STATES PATENTS

| | | |
|---|---|---|
| 1,224,332 | Smith | May 1, 1917 |
| 1,224,370 | Fortescue | May 1, 1917 |
| 1,787,277 | Kennedy | Dec. 30, 1930 |